(12) United States Patent
Buckwater et al.

(10) Patent No.: US 6,599,599 B1
(45) Date of Patent: Jul. 29, 2003

(54) UNDERLAYMENT COMPOSITE AND ASSOCIATED FLOORING INSTALLATION SYSTEM

(75) Inventors: Michael E. Buckwater, New Providence, PA (US); William J. Kauffman, Mannheim, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 09/639,215

(22) Filed: Aug. 15, 2000

Related U.S. Application Data

(63) Continuation-in-part of application No. 09/532,231, filed on Mar. 21, 2000.

(51) Int. Cl.[7] .............................. B32B 33/00; B32B 9/00; B32B 15/04; B32B 7/12
(52) U.S. Cl. .................... 428/40.1; 428/41.7; 428/41.8; 428/354; 428/343; 428/317.3; 428/908.8; 52/746.1
(58) Field of Search .............................. 428/40.1, 41.7, 428/41.8, 354, 343, 317.3, 908.8; 52/746.1

(56) References Cited

U.S. PATENT DOCUMENTS

| | | | |
|---|---|---|---|
| 4,234,649 A | 11/1980 | Ward | 428/255 |
| 4,397,906 A | 8/1983 | Nakagawa et al. | 428/195 |
| 4,405,668 A | 9/1983 | Wald | 428/40 |
| 4,557,774 A | 12/1985 | Hoopengardner | 156/71 |
| 4,824,498 A * | 4/1989 | Goodwin et al. | 156/71 |
| 4,985,279 A * | 1/1991 | Mussallem, III | 427/209 |
| 5,133,166 A | 7/1992 | Pacione | 52/483 |
| 5,160,770 A | 11/1992 | Hoopengardner | 428/40 |
| 5,304,268 A | 4/1994 | Hoopengardner | 156/90 |
| 5,482,755 A | 1/1996 | Manning | 428/95 |
| 5,656,351 A | 8/1997 | Donaruma | 428/97 |
| 5,845,375 A | 12/1998 | Miller et al. | 24/452 |
| 5,891,547 A | 4/1999 | Lawless | 428/92 |
| 5,902,427 A | 5/1999 | Zinke et al. | 156/73.1 |
| 5,942,300 A | 8/1999 | Lukowski, Sr. | 428/40.1 |
| 5,972,148 A | 10/1999 | Lukowski, Sr. | 156/184 |
| 5,993,534 A | 11/1999 | Winterowd et al. | 106/461 |
| 6,167,668 B1 * | 1/2001 | Fine et al. | 52/403.1 |

FOREIGN PATENT DOCUMENTS

| | | | | |
|---|---|---|---|---|
| EP | 0 341 993 A1 | 5/1989 | | A44B/18/00 |
| EP | 0 988 808 A1 | 9/1998 | | A44B/18/00 |
| WO | WO 95/12702 | 5/1995 | | D04H/13/00 |
| WO | WO 97/24482 | 7/1997 | | D04H/1/54 |
| WO | WO 97/26133 | 7/1997 | | B32B/3/06 |

OTHER PUBLICATIONS

WO 97/10921, Method for Installing a Lightweight Carpet.*

* cited by examiner

Primary Examiner—Daniel Zirker
Assistant Examiner—Victor S. Chang
(74) Attorney, Agent, or Firm—Womble Carlyle Sandridge & Rice, PLLC

(57) ABSTRACT

An underlayment assembly comprising an underlayment with an upper and a lower surface, an adhesive layer disposed on the upper surface, and a release [layer] fastener disposed on the adhesive layer, optionally with an adhesive layer on the lower surface of the underlayment, is disclosed. One or more performance enhancing layers, such as foam and solid layers, can be disposed between the underlayment and the adhesive layer to modify and/or enhance various properties of the underlayment. A primary fastener comprising part of a hook and loop fastener assembly can be attached to the upper surface of the underlayment. Mechanical fasteners, such as staples, penetrate the underlayment assembly and engage a structural support member to attach the underlayment assembly thereto. Methods for installing a surface covering over a structural support member using the underlayment assembly are also disclosed.

24 Claims, 5 Drawing Sheets

UNDERLAYMENT COMPOSITE AND ASSOCIATED FLOORING INSTALLATION SYSTEM

CROSS-REFERENCE TO RELATED APPLICATION

This application is a continuation-in-part application of Ser. No. 09/532,231, filed on Mar. 21, 2000.

FIELD OF THE INVENTION

The present invention is directed generally to the field of surface coverings. In particular, the present invention is directed to underlayment assemblies suitable for use with a decorative floor covering.

BACKGROUND OF THE INVENTION

Surface coverings, particularly decorative finished flooring products, often require an underlayment to be installed over a structural wood subfloor or other substrate. Commonly, the underlayment is attached to the substrate by application of an adhesive, nails, screws, staples or any combination thereof. The underlayment serves as a foundation for the application of the surface coverings, and provides a clean, smooth surface upon which to lay the surface coverings. A smooth surface is desirable the so that the substrate's texture or graining is not transmitted through to the viewable surface of the surface covering. Underlayments also should resist dents and punctures from concentrated loads and traffic, and should not contain substances that can stain the surface covering.

In one such type of application, a liquid adhesive is applied to the exposed surface of the underlayment, and then the surface covering is laid over the adhesive which adheres the surface covering to the underlayment. Typically, the adhesives are applied at the installation location by employing a notched trowel to spread the adhesive on the underlayment, which is a labor intensive and often messy process. Roll-on and spray-on adhesives may be employed as well. Such adhesives should firmly bond the surface covering to the underlayment to prevent the surface covering from buckling or curling through a wide range of wear and environmental conditions. Importantly, the adhesive should not contribute to staining of the finished flooring. Further, in conventional on-location adhesive application, the selected adhesive should have certain attributes or properties which make it easy to trowel and provide adequate working time over a wide variety of substrates or underlayments in combination with a wide variety of surface covering backing materials. It is known, however, that such liquid adhesives utilized at the surface covering installation site sometimes have problems with mildew staining, bottom-up staining from the substrate or underlayment, seam contamination, and vapor bubbles.

Another current practice is to provide an adhesive layer on the back of the surface covering itself. Pre-applied adhesives primarily have been utilized for carpet installation. For example, one installation device includes a thin scrim webbing with adhesive on both sides and a release film disposed over the adhesive on one side. Another similar device is a carpet padding which has a pressure sensitive adhesive on both sides and a release film disposed over the adhesive on one side. The exposed adhesive is contacted with the subfloor, and the release film is removed to expose an adhesive layer which receives and bonds to the carpet. These devices, however, are not appropriate for adhering surface coverings such as vinyl flooring to the subfloor. In the case of the scrim device, it is too varied in thickness, which allows its surface texture to show through the vinyl surface covering. Additionally, breakage can occur over its individual strands when thin, smooth, and glossy surface coverings are installed over them. The carpet installation device is likewise unacceptable for vinyl flooring installation, because it provides too much cushioning and not enough resiliency to protect surface coverings, such as vinyl sheet, tile, and veneers and high pressure laminate flooring, from indent or deflection-type damage from concentrated loads. For example, U.S. Pat. Nos. 4,557,774, 5,160,770, and 5,304,268 all to Hoopengardner disclose a carpet pad with pressure sensitive adhesive and a removable release film.

Surface coverings also are known which have a pressure sensitive adhesive layer disposed on the back side or backing material. A protective covering of a releasable film, such as a release paper or a thermoplastic or polyethylene film, is disposed over the adhesive layer. During installation, the releasable film is removed and the surface covering is pressed onto the substrate or underlayment. These surface coverings are produced by applying the releasable film to the adhesive layer by attaching the leading ends of the film and the surface covering to a core roll. The surface covering is oriented such that the adhesive layer faces inwardly towards the core roll and adjacent the protective layer. The core roll then is rotated such that the protective layer is applied to and overlies the adhesive surface as the surface covering is simultaneously collected on the core roll. Self-adhering tile, in which adhesive and release film are on the back of the tile, are prevalent in the residential flooring segment. Also, as indicated above, some manufacturers have introduced self-adhering sheet flooring (roll goods such as carpet and vinyl). This concept, however, usually involves the application of both adhesive and release film to the back of the sheet flooring by the installer. Factory applied adhesive to sheet goods presents a unique set of concerns to manufacturers of conventional flooring products due to manufacturing, logistical, packaging and storage issues.

U.S. Pat. No. 4,397,906 to Nakagawa et al. discloses a multilayer backing material consisting of a polyolefin or polybutadiene foam sheet base layer, a dry coated interlayer of polychloroprene-type adhesive, and a dry coated layer of a mixture of a water-based adhesive and an inorganic filler. The interlayer and dry coated layer can be disposed on one or both sides of the backing material. The dry coated adhesive layers allow use of water-based adhesives to adhere the backing material on one side to wall paper or a non woven fabric and the other side to a floor, wall, or ceiling.

Despite the existing methods of adhering a surface covering to an underlayment, the need for a underlayment assembly that provides a smooth, indent resistant surface for the installation of surface coverings remains. Further, there remains a need for a underlayment assembly which has a pre-applied adhesive layer suitable for bonding a variety of surface coverings, such as finished flooring products, and a release film or paper disposed on the surface. Still further, there remains a need for a method of installing a underlayment assembly over a subfloor system typically found in residential building construction, that employs staples or other like mechanical fasteners. Finally, there remains a need for a method of installing a surface covering onto a underlayment assembly. It is to the provision of a underlayment assembly and associated flooring installation system that meets these needs that the present invention is primarily directed.

SUMMARY OF THE INVENTION

Briefly described, a underlayment assembly of the present invention comprises a substantially rigid underlayment having an upper and a lower surface, a pressure sensitive adhesive layer disposed on the upper surface, and a release layer disposed on the adhesive layer. Another pressure sensitive adhesive layer and another release layer are optionally provided on the lower surface of the underlayment assembly. One or more performance enhancing layers, such as foam and solid layers, are disposed between the underlayment and the adhesive layer to modify and/or enhance various properties of the underlayment assembly. Mechanical fasteners, such as staples, penetrate the underlayment assembly and engage a structural support member, such as a subfloor, to attach the underlayment assembly thereto.

In addition to the above embodiments, the present invention also can include another type of mechanical fastener attached to the upper surface of the underlayment. This mechanical fastener can be incorporated into the underlayment assembly described above along with the various performance-enhancing layers. This mechanical or primary fastener can include either the hook portion or the loop portion of commonly known hook and loop fastener systems. A release layer comprising a release fastener is positioned over the primary fastener in order to protect the primary fastener during shipment and installation. The release fastener can comprise the complementary or mating portion of the hook and loop system, as appropriate, in order to mate with the primary fastener. Additionally the release fastener can comprise a film or sheet having an adhesive on its lower surface, or a tape, such as masking tape.

Another aspect of the present invention relates to a method of installing a surface covering over a structural support member. The method includes providing at least one underlayment assembly made in accordance with the present invention, positioning the at least one underlayment assembly on the structural support member, fastening the at least one underlayment assembly to the structural support member, removing the release layer from the at least one underlayment assembly, and placing the surface covering onto the adhesive layer of the at least one underlayment assembly. The surface covering may be pressed against the underlayment during installation. The underlayment assembly is fastened to the structural support member by the mechanical fasteners. Each mechanical fastener preferably has a crown and the crown is recessed within the underlayment assembly such that the crown is substantially below the surface covering/adhesive interface to provide a substantially protrusion free surface covering.

In the case of the embodiment using a primary mechanical fastener of the hook and loop type, the underlayment assembly which includes the primary fastener is fastened to the structural support member by passing the crown of the staple where other appropriate fastener through the primary fastener so that the crown is below the primary fastener.

Thus, a unique underlayment assembly and associated flooring installation system is provided that successfully addresses the shortcomings of existing underlayments and surface covering installation systems and provides distinct advantages over such underlayments and systems. Additional objects, features, and advantages of the invention will become more apparent upon review of the detailed description set forth below when taken in conjunction with the accompanying drawing Figs., which are briefly described as follows.

DETAILED DESCRIPTION OF THE INVENTION

Figure 1:
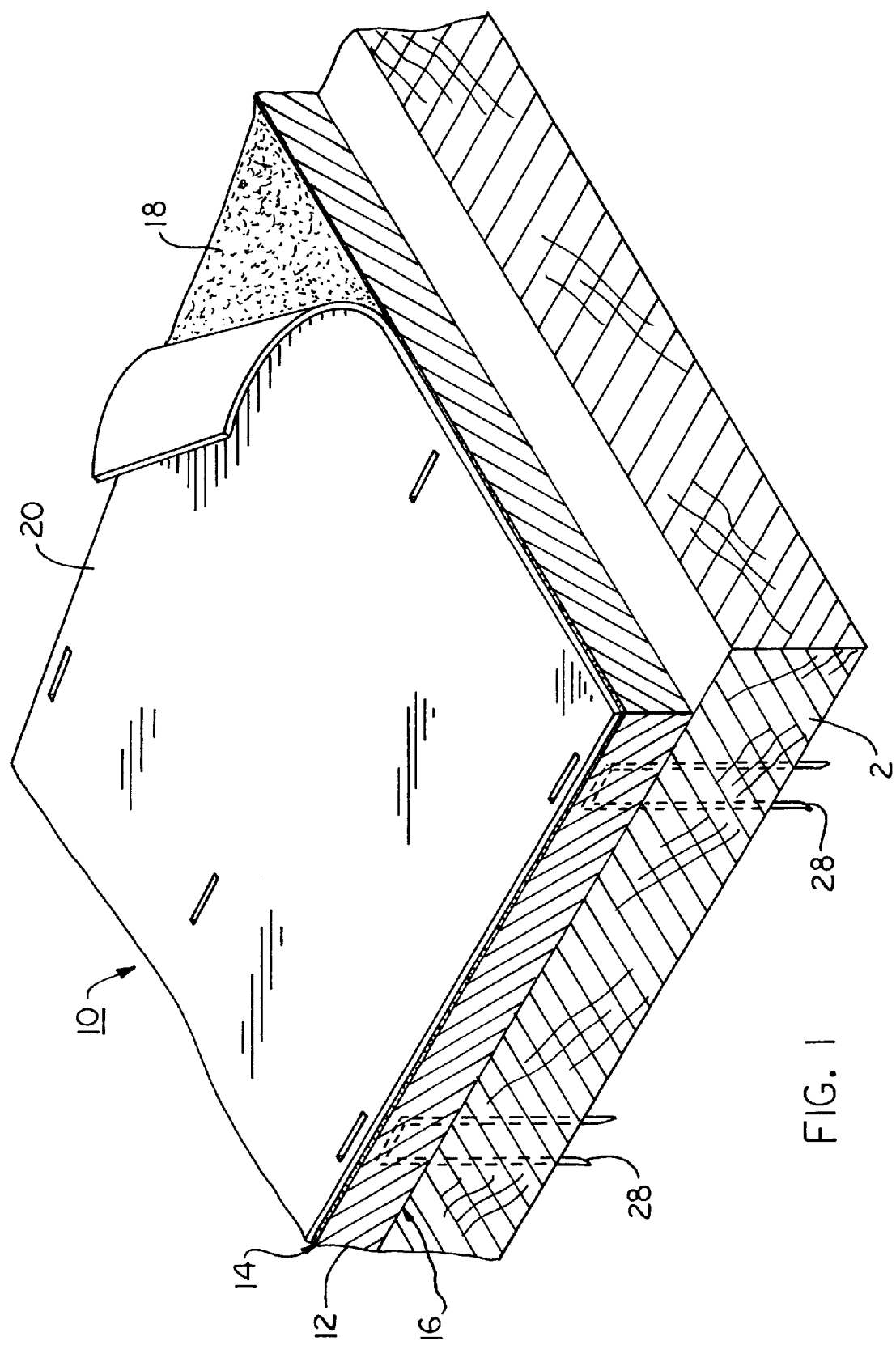
FIG. 1 is a partial view shown in top perspective of an embodiment of a underlayment assembly made in accordance with the present invention installed on a subfloor.

For a more complete understanding of the present invention, reference should be made to the following detailed description taken in connection with the accompanying drawings, wherein like reference numerals designate corresponding parts throughout the several FIGS. Referring to FIG. 1, FIG. 1 illustrates an embodiment of a underlayment assembly 10 made in accordance with the present invention for the installation and bonding of surface coverings (not shown), such as floor, wall, and ceiling coverings thereto, which eliminates the need for on-site adhesive application. In this embodiment, the underlayment assembly 10 comprises an underlayment 12 which has an upper surface 14 and a lower surface 16, a pressure sensitive adhesive layer 18 pre-applied to the upper surface 14, and a release layer 20 disposed on the adhesive layer 18.

Figure 2:
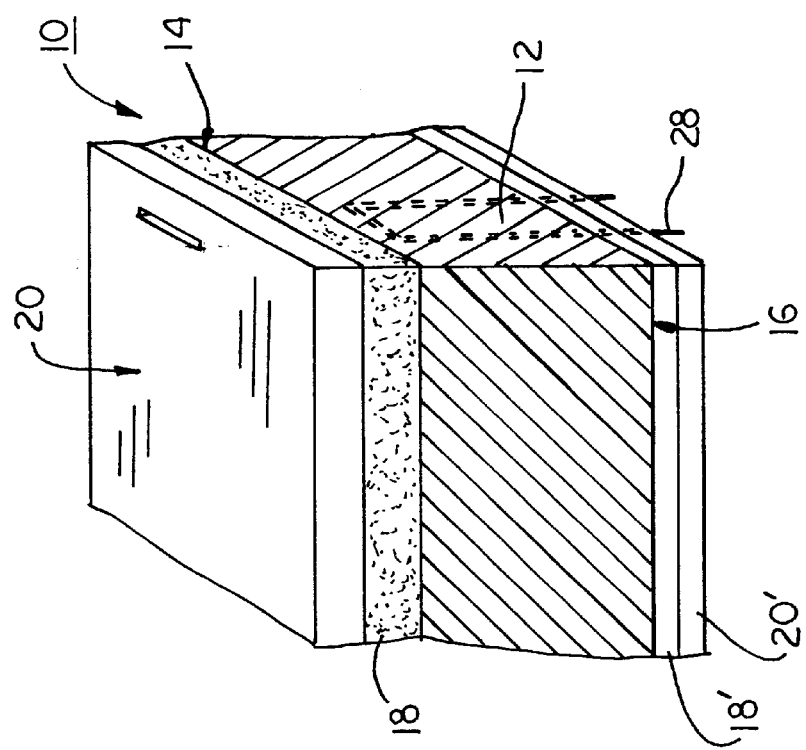
FIG. 2 is a partial view shown in top perspective of a second embodiment of a assembly made in accordance with the present invention.

Referring to FIG. 2, another embodiment of a underlayment assembly 10 of the present invention is illustrated. The lower surface 16 of the underlayment 12 is coated with a second adhesive layer 18 to enhance attachment of the underlayment 12 to the structural support member 2. A second release layer 20' is provided to cover adhesive layer 18' until assembly 10 is ready for installation. This adhesive layer 18', in addition to the mechanical fasteners 28, is utilized to secure the underlayment 12 to the structural support member 2. In particular, if the structural support member 2 is a subfloor, this adhesive layer 18' assists in maintaining a "silent" floor. Often, the mechanical fasteners 28 can loosen from the subfloor over time, and create noise when the flooring is walked upon. The additional adhesive layer 18' further secures the underlayment 12 to the subfloor. This adhesive layer 18' and associated release layer 20' may be the same or different from the adhesive and release layers 18 and 20 disposed on the upper surface 14 of the underlayment 12 or the performance layer 22.

Figure 3:
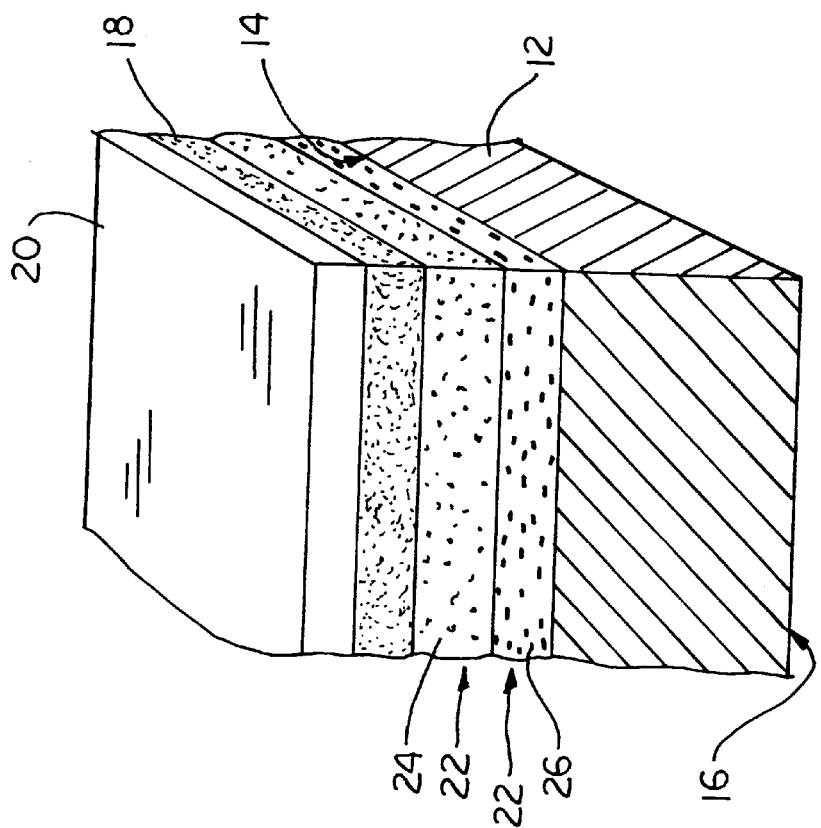
FIG. 3 is a partial view shown in top perspective of a third embodiment of an underlayment made in accordance with the present invention.
Figure 4:
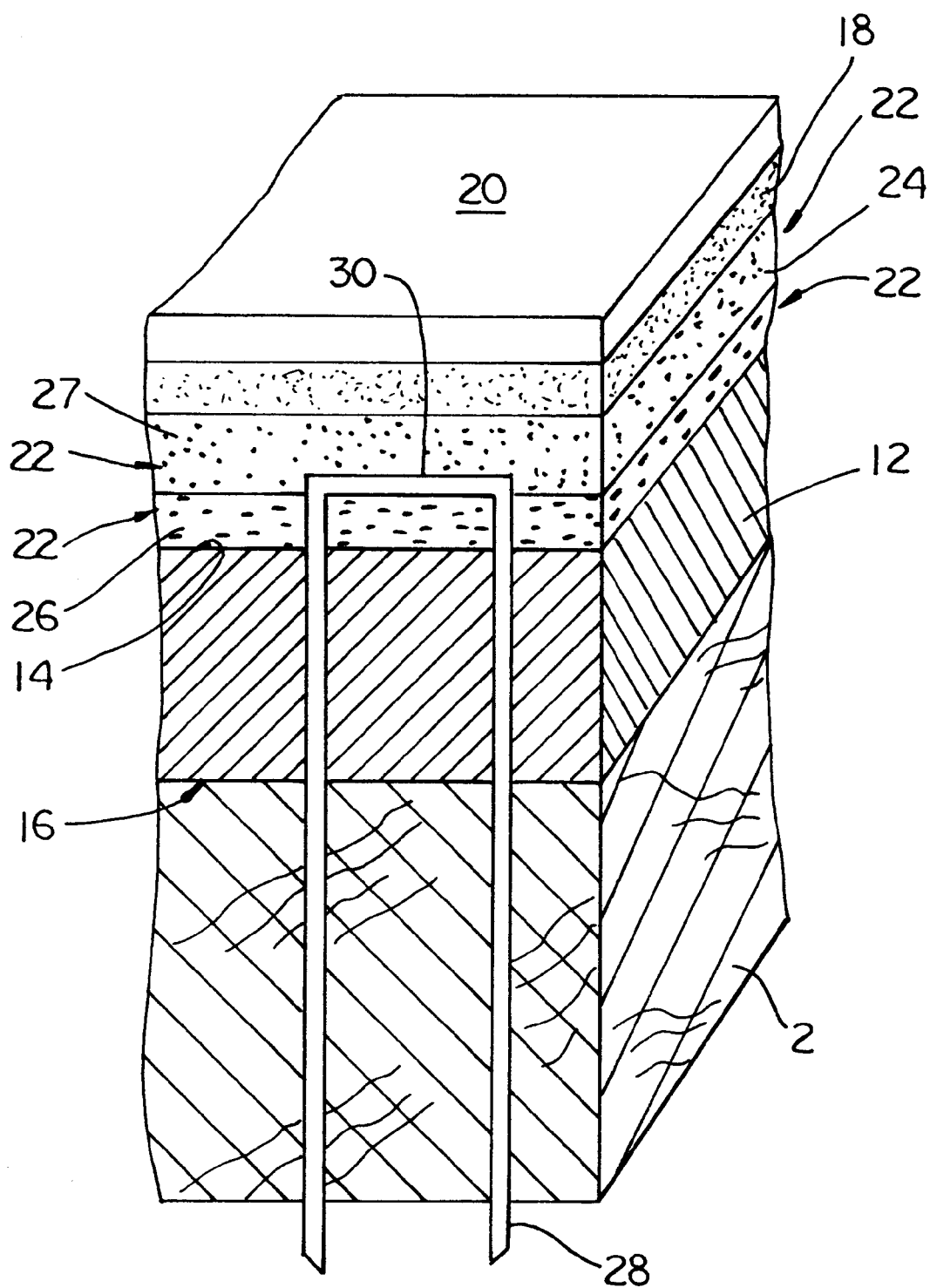
FIG. 4 is a partial view shown in top perspective of the underlayment of FIG. 3 secured to the subfloor.

Referring now to FIGS. 3 and 4, the underlayment assembly 10 comprises one or more performance enhancing layers 22 disposed on the upper surface 14 of the underlayment 12. The performance enhancing layers 22 can provide, for example, improved impact resistance, barrier properties to limit migration of staining agents and moisture from the structural support member 2, and cushioning properties for comfort including short term exposure, such as walking, and long term exposure, such as standing. Further, sound absorbing and transfer properties can be modified by the performance enhancing layers 22. Additionally, the performance enhancing layers 22 can fill in irregularly-shaped areas in upper surface 14, which create additional surface area to be coated by the adhesive, to provide a substantially uniform, smooth surface upon which to apply the adhesive layer 18. As a result, the amount of adhesive needed to coat the underlayment assembly 10 can be reduced. Such performance enhancing layers 22 may include one or more foam layers 24 and/or solid layers 26. The foam layer 24 imparts energy absorption with little or no permanent indent. Additionally, the foam layer 24 comprises a mechanical cushioning layer. Preferably, each foam layer 24 is between about 10 mils to about 100 mils thick. The solid layer 26 includes one or more filled or unfilled polymeric film layers which can either be coated directly on the underlayment or preformed and laminated to the underlayment. Preferably, each solid layer 26 has a thickness between about 1 mil to about 100 mils. As shown in FIG. 3, a solid layer 26, such as an unfilled polyvinyl chloride film layer, is disposed on the upper surface 14 of the underlayment 12, and a foam layer 24 is disposed on the solid layer 26. The adhesive layer 18 is coated onto the foam layer 24, and the release layer 20 is releasably disposed on the adhesive layer 18. As shown in FIG. 4, a first solid layer 26 comprising a filled hot melt calendered ("HMC") polyvinyl chloride layer is disposed on the upper surface 14 of the underlayment 12. A second solid layer 27 comprising an unfilled polyvinyl chloride film layer is disposed on the HMC layer, thereby forming two solid layers disposed on the underlayment 12. The adhesive layer 18 is coated onto the unfilled polyvinyl chloride film layer 27, and the release layer 20 is releasably disposed on the adhesive layer 18. The thickness of the foam and solid layers 24 and 26 are variable depending upon the desired performance enhancement to the underlayment assembly 10.

The release layer 20 facilitates storage of the underlayment assembly 10 in stacks without blocking, protecting the adhesive from dirt and debris during installation, and permits the finished surface covering to be cut, handled, and otherwise maneuvered on top of the underlayment assembly 10 prior to adhering the surface covering to the underlayment assembly 10. Preferably, the release layer 20 comprises a release paper or a release film. Release papers include papers coated with a polymer coating, such as carbon based polymers including polyolefin copolymers, polyesters, polyamides, polyimides, and polyurethanes, or a silicone coating comprising silicone monomers and/or polymers. Release films include films formed from polyolefin copolymers, polyesters, polyamides, polyimides, and polyurethanes. Notably, any release layer 20 comprising a composition capable of being bent and removed from the adhesive layer is suitable for use with the present invention.

After the surface covering is fitted over the underlayment having the release paper for installation, the surface covering is either lifted, in the case of tile, planks, or otherwise small and relatively rigid modules, or folded back on itself in the case of sheet vinyl or carpeting, so that the release layer 20 can be peeled away to expose the adhesive. Once the release layer 20 is removed, the surface covering is returned to the underlayment assembly 10 and placed in contact with the adhesive to form an adhesive and/or mechanical bonding of the surface covering to the underlayment 12.

The underlayment 12 comprises any conventional material utilized as an underlayment in the construction industry. Preferably, the underlayment 12 is formed from a substantially rigid natural or synthetic material. For example, an underlayment 12 of one foot in length which is only supported at one end that does not bend more than 45 degrees from its weight is considered a substantially rigid material. Further, a material which is non-rollable is considered substantially rigid. Such underlayments 12 include without limitation plywood, particleboard, oriented strand board, fiberboard, hardboard, fiber reinforced gypsum board, fiber cement board, cemetitious backerboard, boards comprising recycled materials such as paper, plastic board, fiber/plastic composite board, and any board made from a material having the desired density and smoothness to make it acceptable as an underlayment for surface coverings. Typically, such underlayments 12 are nominally one-quarter inch in thickness, but the thickness can be varied as desired.

The present invention also provides a method and unique installation system for securing the pregluded underlayment assembly 10 to a structural support member 2 by stapling or tacking through the release layer 20 and the adhesive layer 18. As illustrated in FIGS. 1 and 4, the underlayment assembly 10 can be fastened to a structural support member 2, such as, but not limited to, subflooring, sheathing panels, joists, rafters, studs, or furring lath with mechanical fasteners 28. Mechanical fasteners 28 include staples, tacks, nails, screws, and the like in any combination thereof. Preferably, the pregluded underlayment assembly 10 is fastened to the structural support member 2 with staples.

Importantly, in the case where the adhesive is a substantially continuous coating, the mechanical fastener 28 is driven to a sufficient depth such that the uppermost portion or crown 30 of the fastener 28 is recessed below the underlayment/adhesive interface to aide in preventing a protrusion in the visible surface of the surface covering. Preferably, the crown 30 is recessed below the adhesive/underlayment interface. Likewise, if the underlayment 12 has one or more performance enhancing layers 22 disposed thereon, the crown 30 is recessed below the distal performance enhancing layer/adhesive interface. If the pressure sensitive adhesive is disposed on the underlayment 12 or a performance enhancing layer 22 in the form of elongated beads, and the surface covering comprises a substantially rigid material, such as wood, however, it is only necessary for the crown 30 of the mechanical fastener 28 to be below the apex of the bead.

Preferably, the removable release layer 20, the adhesive layer 18, any performance enhancing layer 22, and the underlayment 12 are selected so that mechanical fasteners 28 can penetrate through the release layer 20, the adhesive layer 18, performance enhancing layer or layers 22 if present, and the underlayment 12 to anchor or fasten the underlayment 12 to the structural support member 2, such as a subfloor, and have the crown 30 of the mechanical fastener 28 embedded in the underlayment 12. The release layer 20 readily releases from the adhesive layer 18 even after the mechanical fasteners 28 have penetrated the release layer 20.

Pressure sensitive adhesives include any adhesive system that creates a bond with the flooring material by contact and pressure. There are numerous pressure sensitive adhesives available in the market place suitable for use with the present invention. Pressure sensitive adhesives can include those that are tacky and remain tacky, those that are tacky initially and harden after contact with the flooring material, and those that are non-tacky. Such adhesives include organic solvent-based, water-based, and hot melt adhesives. For example, organic solvent- and water-based adhesives include without limitation styrene butadiene rubber, styrene isoprene rubber, polyisobutylene rubber, styrene-isoprene-styrene ("SIS") and styrene-butadiene-styrene ("SBS") block copolymer rubbers, natural rubber, acrylic homopolymers and copolymers, vinyl acetate copolymers, polyesters, polyurethanes, and asphalt. Hot melt pressure sensitive adhesives include without limitation amorphous polypropylene, polyisobutylene, ethylene vinyl acetate, polyesters, ethylene acrylic acid copolymers, SIS and SBS block copolymer rubbers, and polyurethanes. Additionally, hot melt adhesives also include contact responsive materials such as those described in U.S. Pat. No. 5,888,335 to Kobe et al. These organic solvent-based, water-based, and hot melt adhesive polymers can be blended with a lower molecular weight tactifying resins, such as aliphatic and aromatic hydrocarbons or rosin esters. Additionally, such adhesives include plasticizing oils or plasticizers. Further, the adhesive can be a blend of two or more of these polymers to achieve desired performance characteristics. Suitable adhesives for use with the present invention include water-based adhesives S-580 for Flash Coving, S-89 for Tile, H-630 for Carpet Tile, and H-620 for Vinyl-backed Carpet Tile; organic solvent-based adhesive S-89 for Tile; and hot melt adhesive PLACE 'N PRESS for factory application to tile, all manufactured by Armstrong World Industries, Inc., Lancaster, Pa. Additionally, the adhesive can be a two part system adhesive. In this embodiment, one part of the adhesive is coated onto the underlayment 12 and the second part is coated onto the back of the surface covering. When the second part on the surface covering is contacted with the first part on the underlayment 12, an adhesive chemical reaction occurs to chemically bond the surface covering to the underlayment 12. The adhesive layer 18 can be a substantially uniform layer or non-continuous. For example, the adhesive can be coated onto the underlayment 12 in the form of beads.

The foam layer 24 includes foamable compositions comprising resinous compositions containing a chemical blowing agent that is applied to the upper surface 14 of the underlayment 12 or performance enhancing layer 22 thereon and subsequently expanded or blown. Alternatively, froth foams can be utilized that are applied to the upper surface 14 of underlayment 12 or performance enhancing layer 22 thereon and subsequently cured. Preferably, the foam layer 24 has a substantially uniform thickness. The foam layer 24 can be coated onto the underlayment 12 by any suitable conventional coating apparatus (not shown) such as a screen coater, a reverse roll coater, a doctor blade, an air knife, or other coating apparatus for fluid compositions. If an additional resinous layer is to be coated onto the foam layer 24, the coated underlayment 12 is then passed through a heating unit (not shown) which supplies sufficient heat to at least partially gel the thermoplastic resinous coating without decomposing the blowing agent. Any conventional heating unit such as a bank of radiant heaters, an oven, and the like may be utilized. Otherwise, the temperature of the heating unit can be set sufficiently high to expand and cure the foam layer 24.

Also, extrusion coating and other melt coating techniques for melt processable compositions may be utilized to coat the underlayment 12 or performance enhancing layer 22 thereon with the foam layer 24. Alternatively, the foam layer 24 can be preformed and laminated to the upper surface 14 of the underlayment 12 or performance enhancing layer 22 thereon. Depending upon the material selected, an optional adhesive layer may be required between the foam layer 24 and the underlayment 12 or the performance enhancing layer 22 thereon.

The foam layer 24 of the present invention can be any conventional foam layer used in surface coverings, such as a foam layer used in flooring. In particular, the foam layer 24 can be any suitable material known in the art for producing foam layers such as chemical blown polyvinyl chloride plastisols/organosols, acrylics, polyurethane foams; froth foams such as polyvinyl chloride plastisol, acrylics, etc.; and melt processed foams such as polyvinyl chloride, polyethylene, ethylene vinyl acetate, metallocene polyolefins, elastomeric polyolefin copolymers, etc. Additionally, foams which are cross-linked may also be employed. Further, fibers or fibrous reinforcing mats may be included as part of the foam layer 24. Preferably, the foam layer 24 is a resilient, cellular foam layer. Additionally, a non-foam (mechanical cushioning) cushion layer such as SKYDEX® made by SKYDEX Cushioning Technologies can also be utilized in this invention. There are no limitations on the nature of the foam layer composition utilized with the present invention except as limited by the manufacturing process employed and desired performance characteristics of the underlayment assembly 10.

As indicated above, the expandable resinous composition comprising the foam layer 24 includes an effective amount of a foaming or blowing agent. The larger the amount of blowing agent within practical limits used, the greater is the expansion of the foam. Foaming or blowing agents are well known in the art, and the particular blowing agent selected usually depends on such matters as cost, resin, and desired foam density. Complex organic compounds which, when heated, decompose to yield an inert gas and have residues which are compatible with the resin are preferred as foaming or blowing agents. Such materials should have the property of decomposition over a narrow temperature range which is particularly desirable to obtain a good foam structure. Examples of typical foaming or blowing agents include without limitation substituted nitroso compounds substituted hydrazides, substituted azo compounds, acid azides, and guanyl compounds, to name only a few. Foaming or blowing agents for use in the present invention must be decomposed an effective amount at a temperature below the decomposition temperature of the resinous compositions and underlayment 12. The preferred foaming or blowing agents are those that decompose above the elastomeric point of the resin composition of the foam layer 24 since this enables at least partial gelling of the foam layer 24 so that additional layers can be coated thereon if desired. Additionally, accelerators or catalysts can be added to the resinous composition of the foam layer 24 to accelerate the decomposition of the blowing agents, reduce the decomposition temperature, act as stabilizers for the resinous composition, and/or narrow the decomposition temperature range. Such accelerators and catalysts are known in the art. Further discussion of foaming or blowing agents is provided in U.S. Pat. No. 3,293,108, incorporated herein by reference. Further, the resinous composition can include solvents, viscosity modifiers, color and UV stabilizers, and the like.

The solid layer 26 comprises a coat or film of a filled or unfilled resinous or polymeric composition. The solid layer 26 is applied over either the upper surface 14 of the underlayment 12, the foam layer 24, or any other solid layer 26 by suitable conventional coating apparatus (not shown) such as a screen coater, a reverse roll coater, a doctor blade, an air knife, or other coating apparatus for fluid compositions. Examples of film layers that can be coated directly on the underlayment 12 or performance enhancing layer 22, if present, include polyvinyl chloride plastisol films, and solvent- or water-based films based upon polyvinyl chloride, polyesters, polyamides, polyurethanes, etc. These coated films can either be thermoplastic or thermoset in nature, and the selection may be tailored to cooperate with the manufacturing process employed to coat the underlayment. Additionally, these film layers can be preformed from the compositions described above, or they can be formed on the underlayment or performance layer by calendering or extrusion processes. These film layers can also include polyethylene terephthalate, polyvinyl chloride, polyolefin homo- and copolymers, polyurethanes, polyamides, polyesters, polyvinylidene chloride, etc. Depending upon the film layer selected, an optional adhesive layer may be required between the underlayment and the film layer. Preferably, the film layer has a substantially uniform thickness across the underlayment 12 or the performance layer 22, if present. The film layer can be transparent, translucent, or pigmented opaque. It can also contain fibers or reinforcing fibers or fibrous mats. The film layer employed should adhere to the underlayment and/or performance layer, if present, and should be compatible with the adhesive/release paper, as well as the product installed in contact with this adhesive.

After applying the solid layer 26, if the solid layer 26 comprises a heat curable composition, the coated underlayment 12 is passed through a heating unit (not shown) which supplies sufficient heat to at least partially gel the solid layer 26 if an additional fluid resinous composition is to be applied. For example, if the expandable foam layer 24 is present and additional performance enhancing layers 22 are desired, the temperature of the heating unit should be sufficient to at least partially gel the wear layer without decomposing the blowing agent. Again, any conventional heating unit such as a bank of infra-red heating lamps, an oven, and the like may be utilized. Otherwise, the temperature of the heating unit can be set sufficiently high to cure the wear layer.

The term "gel" includes both the partial solvation to the elastomeric point of the resinous composition and complete solvation of the resin or resins with the plasticizer to fuse the resinous layers. For example, the temperature is raised to between about 275° F. and 325° F., preferably about 300° F., to gel the polyvinyl chloride resinous compositions. If the non-gelled foam layer 24 or the gelled foam layer 24 and non-gelled wear layer are to be cured, the coated underlayment 12 is then passed through a fusion oven (not shown) to expand and cure the foam layer and/or cure the wear layer. The fusion oven can be any heating apparatus such as a hot air impingement oven or infra-red heat lamps. The fusion oven raises the temperature of the resinous compositions on the underlayment 12 sufficiently high to cause the selective decomposition of the blowing agent contained in the foam layer 24 and to completely solvate and fuse all resinous layers on the underlayment 12. Upon exiting the fusion oven, the coated underlayment 12 is preferably allowed to cool prior to applying the adhesive layer 18.

If desired, a solid layer 26 comprising the HMC layer manufactured by a HMC process can be coated onto any of the underlayment 12, the foam layer 24, or other solid layer 26. HMC refers to the process of formulating a homogeneous mixture containing a hot melt processable resin and preferably plasticizer, stabilizer, filler, and other ingredients, heating the mixture, and delivering the heated mixture to a calender where the mixture is applied in a precisely controlled thickness to the underlayment 12 or the foam or solid layers 24 and 26 thereof to form a laminated underlayment 12. Such melt processable resins include, but are not limited to, polyvinyl chloride (including general purpose polyvinyl chloride as defined in ASTM Standard D1755-92), polyethylene, polypropylene, polystyrene, and copolymers thereof. Fillers include, without limitation, mineral fillers, such as clay, talc, dolomite, and limestone. The HMC composition may be tailored to achieve the desired performance enhancing characteristic for the underlayment assembly 10.

The constituents of the HMC layer are mixed in a mixer (not shown), and fed into a calender (not shown) at a desired mix temperature. The calender nip opening (not shown) of the calender is adjusted to the desired thickness of HMC layer, and the HMC layer is melt-coated directly onto the underlayment 12 or any layer thereon by bringing the underlayment 12 or layer thereon into contact with a calender transfer roll (not shown) in a continuous process to form a laminated HMC underlayment 12.

Optionally, besides the layers discussed above, one or more additional layers can be present, such as the layers described in U.S. Pat. No. 5,458,953 to Wang et al., incorporated herein in its entirety by reference. Such additional layers include strengthening layers, additional foamable layers, and a wear layer base coat. The composition of these layers and their locations are described in U.S. Pat. No. 5,458,953 and can be used in underlayment assembly 10 of the present invention. Such layers are disposed between the underlayment 12 and the adhesive layer 18.

EXAMPLES

Example 1

Various types of conventional underlayments were coated with an acrylic copolymer emulsion pressure sensitive adhesive. The underlayment sample size varied from 12"×12" to 24"×24", and ranged in thickness from 0.20" (5.2 mm) to 0.375" (9.5 mm). Underlayments included plywood, such as fir, poplar, arctic birch, and lauan, various species of oriented strand board, particleboard, hardboard or fiberboard, and fiber-reinforced gypsum and cementitious boards. The adhesive used was Armstrong S-580 FLASH COVE ADHESIVE, an acrylic polymer emulsion supplied by Franklin International, described as COVINAX 379-02. COVINAX 379-02 is a surfactant-stabilized, acrylic copolymer for use as a permanent pressure sensitive adhesive containing 62%–64% solids and 8.6 lb. per gallon.

The adhesive was applied with a 3/16" nap paint roller and allowed to air dry. Tests conducted with one and two coats of adhesive, depending on the texture and porosity of the underlayment substrate, yielded dried weights of the adhesive film ranging from 3.3 grams/ft$^2$ to 11 grams/ft$^2$. Upon drying, a white, silicone treated release paper obtained from Peterson Scanproof, Saffle, Sweden, typical of that used on the back of place-and-press self-adhering tile, was positioned on top of the adhesive film. The silicone treated side was positioned adjacent the adhesive layer, and rolled into place with a hand roller. Typical values of the release paper were: Caliper, 2.2 mils; Tensile, 30 lb./in MD, 13 lb./in AMD.

Example 2

Underlayments coated with adhesive as described in Example 1, had the adhesive layer covered with alternative release papers and release films. These included polyethylene and/or polypropylene sheeting in various thicknesses ranging from 1 mil to 10 mils. Other felts and papers with various release coatings employed in the manufacture of vinyl flooring were also employed as a release layer on top of the adhesive layer. Silicon release coated paper obtained from SD Warren Company, flooring release paper carrier corresponding to U.S. Pat. No. 4,423,100, polypropylene coated paper obtained from Fortifiber Corp., and release paper used to protect plexiglas sheeting (Cyro Acrylite®) from Cyro Industries were employed. Small samples were created using various tapes, such as paper masking tape and duct tape, to cover the upper adhesive side of the sample so that the characteristics of the protective covering could be determined when fasteners were plunged through the top surface as described in Example 3 below.

Example 3

The method of installing the underlayment assembly was demonstrated by stapling the underlayment to a structural wood panel typical for subfloorings. Although any conventional stapling tool capable of inserting a staple into a subfloor and an underlayment may be utilized in the method of the present invention, pneumatic staplers manufactured by Paslode (a division of Illinois Tool Works) and Spotnails, Inc. were used in this example. The stapling tools employed were pneumatic, electric, or manually activated with a mallet and were an "oil-less" design to prevent contamination which could compromise adhesion or cause staining. The staples were 18 gauge, chisel or divergent chisel point of ⅝" to 1" length with a crown of 3/16" to ¼". The air pressure was regulated to conform to the stapling tool manufacturer's recommendations and adjusted as appropriate for the type of subfloor and the underlayment assembly employed. Generally, pressure ranged from 75 psi to 100 psi, so that the staple penetrated through the release layer and the adhesive layer, with the final placement of the staple having the top of the crown just recessed in the underlayment substrate below the plane of the adhesive/substrate interface, as indicated in FIGS. 1 and 4.

When penetrated with the staples, underlayments with a release layer of a white, silicone treated release paper showed that the staple and plunger device on the staple gun would cut a small rectangular hole in the release layer approximating the size of the staple crown. This small cut out of release layer was carried by the staple into the underlayment and did not interfere with overall surface smoothness of the underlayment. It was found that most of the other paper and felt release layers and protective tapes were cut in similar fashion, having the displaced cut out portion carried below the adhesive layer and trapped underneath the crown (top) of the staple in the underlayment.

Some polyolefin or polyethylene release films would sometimes show a similar cut out mechanism to the paper release layers when penetrated by the staples. Other polyolefin films, depending on their physical properties would show more of a cut or slit in the film rather than an actual "cut out". There was also some elongation deformation of some polyolefin films. This was noted in the subsequent examples when the release layer was actually peeled from the adhesive layer in preparation for bonding the finished flooring. There was occasional tearing away of the portion of film trapped under the crown of the staple from the main portion of the release film.

Example 4

The ability to peel off and remove the various top layer release papers and films was tested by lifting up one corner of the release layer and then removing it in a peeling fashion from the pre-applied adhesive layer. Most of the coated paper and polyolefin film release layers released with a minimal amount of effort and left behind a clean, tacky adhesive surface on the upper surface of the underlayment, ready to accept the floor covering. The silicon release paper from SD Warren and the release paper corresponding to U.S. Pat. No. 4,423,100 did not release cleanly and left too much residue on the adhesive. This is primarily due to the relative thickness of the paper. In this initial testing the silicone treated papers at 2.2 mils thickness, and the polyethylene sheeting in the 5 mils thickness range showed satisfactory results. Polyethylene film of approximately 1.0 mil to 1.5 mils thickness would sometimes elongate and tear leaving a small torn piece behind on the adhesive where a staple penetration was located.

Suitable release layers allowed the staple to penetrate through and into the underlayment, had sufficient durability to support limited traffic during the cutting and fitting process of the decorative floor covering, were easily removed from the adhesive leaving a clean, smooth adhesive surface and did not pre-release during cutting and handling of the underlayment.

Example 5

Samples of various floor coverings were bonded to the exposed adhesive layer after the protective release layer was removed. The flooring types included dry-back residential tile, SUCCESSOR INTERFLEX sheet flooring, INITIATOR and STARSTEP sheet flooring in both conventional felt and ToughGuard® structures, and glass-encapsulated, vinyl-backed sheet structures, all in the vinyl flooring category and all made by Armstrong World Industries, Inc., Lancaster, Pa. Urethane and vinyl-backed carpet and carpet with ACTION BAC® and hot melt backings were also adhered to the underlayments.

After being laid on top of the adhesive layer, the flooring samples were rolled with a hand roller as is typical of bond tests in the laboratory. The resultant bonds were checked by starting in the corner of the flooring sample and attempting to peel the sample from the underlayment. The initial bonds were found to be stronger than that of conventional troweled-on, water-based adhesives. Some of the felt-backed vinyl floors showed a delamination of the felt backing when peeled. Some of the urethane foam backings on carpet samples also showed delamination of the foam. Other vinyl-backed carpet and vinyl sheet goods peeled rather cleanly from the adhesive film with sufficient effort.

Therefore, a wide variety of flooring products can be bonded with the underlayment assembly and this method of installation. Also, the adhesive types, formulations, and thickness of the adhesive layer may be tailored and adjusted so as to achieve optimum performance with particular types of floor coverings and may be designed to give the desirable traits of releasability and reuse with subsequent floor coverings.

Example 6

Six larger prototypes were prepared by applying an adhesive layer and a release layer to 2 ft.×2 ft. underlayments so that a total of 24 sq. ft. could be installed on a 4 ft.×8 ft. piece of structural subflooring positioned on a supporting surface. An installation simulation was then performed. The underlayment was fastened to the subflooring using staples as described in Example 3. While working on top of the underlayment, two pieces of rotogravure printed vinyl flooring were cut and fit to the size of the panel with the pattern matched where the two pieces of vinyl flooring overlapped. A seam then was cut in the vinyl using a conventional double-cut seam method. One-half of the vinyl flooring was lapped back at a time to allow for removal of the release layer on the underlayment. The release layer was removed and the vinyl laid back down in position on top of the adhesive. The seam area was rolled with a hand roller, and the remaining vinyl in contact with the adhesive was lightly rubbed with hand pressure and a clean dry cloth. The remaining half of the flooring was lapped back so that the release layer could be removed and then carefully laid back in position. This portion of the seam area was likewise rolled with a hand roller. The entire installation was then rolled with a 100 lb. roller. The resultant installation was firmly bonded and could be trafficked immediately without tracks being made in the freshly installed flooring.

Example 7

Two 2 ft.×2 ft.×¼" thick pieces of underlayment comprising oriented strand board were coated with plastisol, and the plastisol was gelled and cured at approximately 350° F. One board had a plastisol clear coat formulation of approximately 3.5 mils thick applied to it, while the other board had a foamable plastisol formulation of approximately 8 mils thick applied to it. Both plastisols were generically typical of formulations used in the manufacture of vinyl flooring. The resultant upper surface of the underlayment showed improved smoothness and uniformity over the underlayments described in Examples 1–6.

Therefore, a plastisol layer can be coated onto the upper surface of the underlayment to improve or enhance desirable characteristics, such as smoothness, underfoot comfort, acoustical properties, performance properties of the decorative floor covering, and to reduce the amount of adhesive required or improve the adhesive performance of the adhesive layer.

Example 8

Armstrong S-580 adhesive (Armstrong World Industries, Inc., Lancaster, Pa.) was applied to the plastisol coated surface of the two underlayment samples described in Example 7. After the adhesive had air-dried, a polyolefin film release layer was placed on top of the adhesive layer. Additional intermediate layers, therefore, can be incorporated between the underlayment and the adhesive layer in the underlayment assembly of the present invention.

Example 9

The underlayment assembly samples with plastisol interlayers described in Example 8 were installed with staples on top of a structural subfloor panel. The release layer was removed and samples of both vinyl-backed and felt-backed vinyl floors were installed on them.

Figure 5:
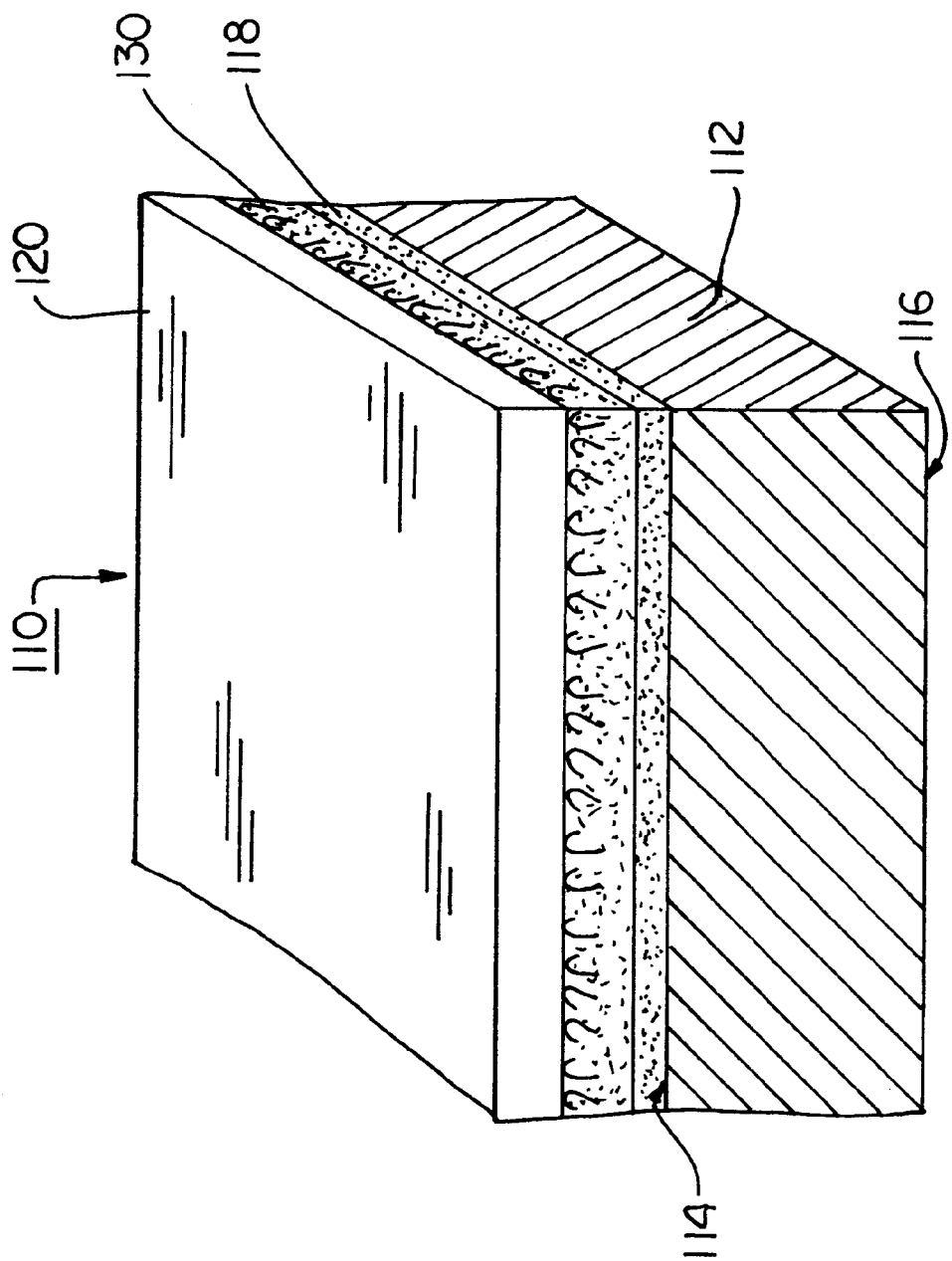
FIG. 5 is a partial view shown in perspective of another embodiment of the present invention.
Figure 6:
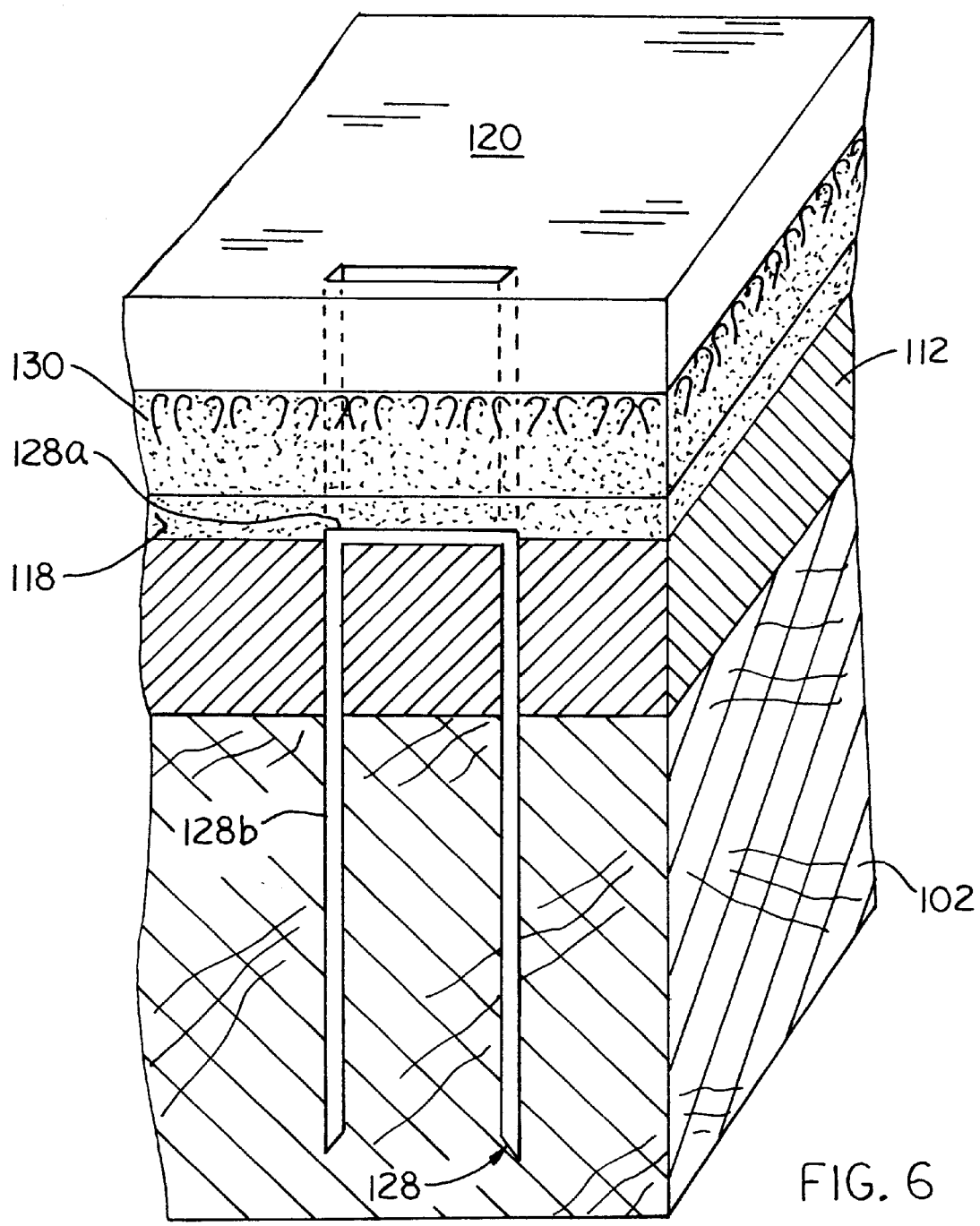
FIG. 6 is a partial view of the embodiment of FIG. 5 showing the underlayment secured to the subfloor.

Additional embodiments of the present invention incorporate a mechanical fastener into an underlayment assembly, as shown in FIGS. 5 and 6. The preferred type of mechanical fastener comprises a cooperative hook and loop assembly, a first part of which is incorporated in the underlayment assembly and a cooperating or second part of which is incorporated into the surface covering supported by the underlayment assembly in use.

FIG. 5 shows underlayment assembly 110, comprising an underlayment base 112, having an upper surface 114, a lower surface 116, and a protective covering or release fastener 120. An adhesive layer 118 covers, either partially or entirely, upper surface 114. The adhesive can be a contact or pressure sensitive adhesive, although the present invention works well with various adhesives which bond a mechanical fastener to upper surface 114 sufficiently to prevent either lateral movement of the mechanical fastener or the separation of the fastener from the underlayment base 112 by normal movement. The adhesive must be compatible with both the composition of mechanical fastener and the underlayment base 112. Specific types of adhesives found satisfactory for use as adhesive layer 118 are listed above with respect to the previous embodiments, and in Examples 10, 11 and 12 of the present embodiment.

A primary fastener 130 is attached to the upper surface 114 of underlayment base 112 by adhesive layer 118. Primary fastener 130 is a mechanical fastener, most suitably either a hook fastener or a loop fastener, although other types of mechanical fasteners suitable to accomplish the securing of a surface covering to an underlayment are within the scope of the present invention. The primary fastener can be of the hook and loop type commonly known as VELCRO®, which is available from VELCRO, USA, Manchester, N.H.

As is commonly known, a hook and loop system of this type comprises a two part, cooperative mechanical system with a hook component adapted to mate with a loop component. In the present invention, the primary fastener 130 can comprise either the hook component or the loop component. It is preferred, however, that the primary fastener be comprised of the hook component. Most preferred are hooks that impact a strong adhesion to a loop component attached to a surface covering (not shown), to prevent appreciable lateral or appreciable normal movement between the two components. The primary fastener also can comprise a nodule and loop system, as well as other mechanical fastening systems.

It also is preferred, although not required, to have a protective covering positioned over the primary fastener, in order to protect the primary fastener during handling, such as transport, storage and installation of the underlayment assembly 110. If incorporated into the present invention, the protective covering can comprise a mechanical fastener, such as a hook fastener or a loop fastener, or a nodule and loop fastener, typically in sheet form. If a hook fastener is used as the primary fastener, the protective covering, or release fastener 120, should comprise a loop fastener or loop component of a hook and loop assembly. Conversely, if the primary fastener 130 comprises a loop fastener, the release fastener should comprise a cooperating or mating hook fastener. Nodule and loop mechanical fasteners also can be selectively used as either the primary or the release fastener. The type of release layer or release fastener 120, if used, is not limited to a hook and loop fastener component, but also can comprise a release layer of the type described in the previous embodiments. Additionally, the release fastener 120 can comprise tape, either in sheet or strip form, such as tape commonly referred to as masking tape. A tape fastener found usable with the present invention is TESA 53123 Light Duty Tape manufactured by TESA TAPE, Inc., Charlotte, N.C. If a release fastener or layer 120 is used, the strength of the mechanical bond between the release layer 120 and the primary fastener 130 should be sufficiently low to permit easy removal during installation without damaging the primary fastener or removing the primary fastener from the underlayment base 112. The strength of the bond between the release layer 120 and the primary fastener 130 should be less than that of the bond between the primary fastener 130 and the underlayment base 112. The strength of the bond between the release layer 120 and the primary fastener 130 is less than the strength of the bond between the surface covering (not shown) and the primary fastener 130.

The above components of the present embodiment comprise underlayment assembly 110, although as discussed above, the present invention does not require the release layer or fastener 120. Additional components, such as performance enhancing layers of the type and of the composition described above with respect to the previous embodiments can be used. As in the previous embodiments, the performance enhancing layer or layers, if used, are positioned below adhesive layer 118 and above underlayment base 112. Additionally, the primary fastener can be manufactured from any of the compounds discussed above which form a performance enhancing layer, such as a foam layer, solid layer or combinations thereof. In this case, the primary fastener, itself, functions as a performance enhancing layer. Further, in the manufacturing process of the underlayment assembly 110, it is possible to optionally eliminate the adhesive layer 118 and adhere the primary fastener 130 directly to underlayment base 112. For example, the underlayment base 112 can include adhesive or tacky material and/or resin which provides tack to the surfaces of the underlayment base. Otherwise, the primary fastener 130 can be laminated to the underlayment base 112 by subjecting the primary fastener 130 to heat and contacting the heated fastener 130 to the underlayment base 112.

The present invention also includes the method and installation system for securing the underlayment assembly 110 to a structural support member 102 (FIG. 6). The method and installation system for underlayment assembly 110 of the present embodiment includes stapling or tacking assembly 110 through the release fastener or release layer 120 and the primary fastener 130 as shown in FIG. 6. The types of structural support members contemplated in relation to the present invention and the types of mechanical fasteners used to attach underlayment assembly 110 to a structural support member 102 are identical in the present embodiment as in the previous embodiments discussed above. As in the previous embodiments, preferably the underlayment assembly 110 is fastened to the structural support member 102 with staples. The mechanical fastener 128 is installed so as to penetrate into underlayment assembly 110 so that the crown 128a of the fastener is preferably below the upper surface of the primary fastener. The shank 128b of the fastener is driven through the underlayment base 112 and into the subfloor material 102. Additionally, the mechanical fastener 128 will be driven through any release layer or release fastener 120, if present, during installation of mechanical fastener 128.

After securing underlayment assembly 110 to a supporting structure, such as subfloor 102, the release fastener or layer 120 is removed from the primary fastener to expose the primary fastener. A surface covering, such as flooring, ceiling covering or wall covering, is then positioned over the primary fastener to contact the primary fastener. Pressure may be applied to the surface covering (not shown) to effect a suitable bond between the primary fastener and the surface covering. Such surface covering will have the cooperative or mating component attached to the undersurface thereof.

ADDITIONAL EXAMPLES

Example 10

A primary, hook-type fastener, Hook 29PP, available from Velcro USA, Inc. was adhered to a plywood underlayment base panel using the pressure sensitive or contact adhesive, Acronal V210, available from BASF Corporation, Charlotte, N.C. A release fastener or release layer comprising a loop-type mechanical fastener, Aspen Loop, available from Velcro USA, Inc., was applied to the primary fastener to complete the underlayment assembly. The underlayment assembly was installed to a subfloor as described in Example 3. The staples used to attach the underlayment assembly to the subfloor were driven into the subfloor so that the staple crown was positioned below the upper surface of the primary fastener. A fabric backed surface covering, Mannington Performer I Back, pattern number 62089 floor product, was installed onto the primary fastener as described in Example 6. The resulting installation is firmly bonded together, and could be trafficked immediately.

Example 11

The type of primary fastener, Hook 29PP, was attached to a plywood underlayment, as described in Example 7. The release fastener or release layer, however, comprised masking tape, which was applied to the upper surface of the primary fastener. The masking tape was TESA 53123 Light Duty Tape, available from TESA TAPE, Inc., Charlotte, N.C. The underlayment assembly was installed to a subfloor as described in Example 3. The surface covering of the type described in Example 7 was installed onto the primary fastener, using the method described in Example 6. The resulting installation was firmly bonded and could be trafficked immediately.

Example 12

This example was manufactured and installed identically as the product and installation described in Example 8, except that the release fastener comprised a masking tape, ST-24: PP-T-42C, type 2, available from Spec Tape, Inc., Cincinnati, Ohio. This tape used was 8 mils in thickness.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. An underlayment assembly comprising:
    a substantially rigid underlayment base having an upper and a lower surface;
    an adhesive layer disposed on the upper surface;
    a primary fastener disposed on the adhesive layer, said primary fastener comprising a mechanical fastener; and
    a release fastener disposed on the primary fastener;
    wherein the underlayment is selected from the group consisting of plywood, particleboard, oriented strand board, fiberboard, hardboard, fiber reinforced gypsum board, fiber cement board, cementitious backerboard, recycled material board, plastic board, and fiber/plastic composite board.

2. The underlayment assembly of claim 1, wherein said primary fastener is selected from a group consisting of hook fasteners and loop fasteners.

3. The underlayment assembly of claim 2, wherein said release fastener is selected from a group consisting of hook fasteners and loop fasteners.

4. The underlayment assembly of claim 1, wherein said primary fastener is selected from a group consisting of nodule fasteners and loop fasteners.

5. The underlayment assembly of claim 4, wherein said release fastener is selected from a group consisting of nodule fasteners and loop fasteners.

6. The underlayment assembly as claimed in claim 1, further comprising:
    a second adhesive layer disposed on the lower surface of the underlayment base; and a second release fastener disposed on the second adhesive layer.

7. The underlayment assembly as claimed in claim 1, further comprising:
    at least one performance enhancing layer disposed between the underlayment base and the adhesive layer.

8. The underlayment assembly as claimed in claim 7, wherein the at least one performance enhancing layer is selected from the group consisting of a foam layer, a solid layer, and combinations thereof.

9. The underlayment assembly as claimed in claim 8, wherein the solid layer comprises a cured fluid, resinous coating composition.

10. The underlayment assembly as claimed in claim 8, wherein the solid layer comprises a melt processable resinous composition.

11. The underlayment assembly as claimed in claim 8, wherein the solid layer comprises a polymeric film disposed on the upper surface of the underlayment base.

12. The underlayment assembly as claimed in claim 1, wherein the adhesive layer is selected from the group consisting of an organic solvent-based adhesive, a water-based adhesive, a hot melt adhesive, and combinations thereof.

13. The underlayment assembly as claimed in claim 1, wherein the release fastener is a release paper or a release film.

14. The underlayment assembly as claimed in claim 1, further comprising:
   at least one mechanical fastener disposable through the release fastener, the primary fastener, the adhesive layer and the underlayment base, and into a structural support member for fastening the underlayment assembly to the structural support member.

15. The underlayment assembly as claimed in claim 14, wherein the mechanical fastener disposable through the release fastener has a crown, the crown being positioned below the upper surface of the primary fastener.

16. The underlayment assembly as claimed in claim 15, wherein the crown is positioned flush with the upper surface of the underlayment base.

17. The underlayment assembly as claimed in claim 15, wherein the crown is positioned below the upper surface of the underlayment base.

18. The underlayment assembly as claimed in claim 14, wherein the at least one mechanical fastener disposable through the release fastener is selected from the group consisting of staples, tacks, nails, screws, and combinations thereof.

19. The underlayment assembly as claimed in claim 14, wherein the at least one mechanical fastener disposable through the release fastener is a staple.

20. The underlayment assembly of claim 1, wherein the release fastener is selected from a group consisting of hook fasteners and loop fasteners.

21. The underlayment assembly of claim 1, wherein the release fastener comprises tape having an upper surface and a lower surface, and a contact adhesive layer disposed on said lower surface.

22. The underlayment assembly of claim 1, wherein the at least one mechanical fastener has a crown and is disposable through the release fastener; further comprising a substrate;
   wherein the underlayment is fastened to the substrate with the lower surface of the underlayment adjacent the substrate, and the crown being positioned between the upper surface of the primary fastener disposable through the release fastener and the lower surface of the underlayment base.

23. The underlayment assembly as claimed in claim 22, further comprising at least one performance enhancing layer disposed between the adhesive layer and the underlayment base.

24. The underlayment assembly as claimed in claim 22, further comprising:
   a second adhesive layer disposed on the lower surface of the underlayment base; and another release layer disposed on the said adhesive layer.

* * * * *

UNITED STATES PATENT AND TRADEMARK OFFICE
CERTIFICATE OF CORRECTION

PATENT NO. : 6,599,599 B1  Page 1 of 1
DATED : July 29, 2003
INVENTOR(S) : Buckwalter et al.

It is certified that error appears in the above-identified patent and that said Letters Patent is hereby corrected as shown below:

Title page,
Item [75], Inventor, correct Inventor name from "Buckwater" to -- Buckwalter --; and correct residence for Inventor "Kauffman" from "Mannheim" to -- Manheim --;
Item [*] Notice, correct Notice regarding the extension of the patent term from "0" to -- 59 --;
Item [57], ABSTRACT,
Line 3, delete "[layer]";

Column 4,
Line 35, correct "18" to -- 18' --;

Column 18,
Line 27, delete "another release layer" and insert -- a second release fastener --;
Line 28, after the word "said" insert -- second --.

Signed and Sealed this

Twenty-third Day of December, 2003

JAMES E. ROGAN
*Director of the United States Patent and Trademark Office*